(12) United States Patent
Feldpausch

(10) Patent No.: US 12,599,147 B2
(45) Date of Patent: Apr. 14, 2026

(54) MANUFACTURE OF NON-DAIRY FROZEN DESSERT

(71) Applicant: Dave Feldpausch, St. Johns, MI (US)

(72) Inventor: Dave Feldpausch, St. Johns, MI (US)

(73) Assignee: Dave Feldpausch, St. Johns, MI (US)

( * ) Notice: Subject to any disclaimer, the term of this patent is extended or adjusted under 35 U.S.C. 154(b) by 603 days.

(21) Appl. No.: 18/164,401

(22) Filed: Feb. 3, 2023

(65) Prior Publication Data

US 2024/0260605 A1     Aug. 8, 2024

(51) Int. Cl.
| | |
|---|---|
| *A23G 9/22* | (2006.01) |
| *A23G 9/12* | (2006.01) |
| *B01F 23/23* | (2022.01) |
| *B01F 27/115* | (2022.01) |
| *B01F 27/191* | (2022.01) |
| *B01F 27/73* | (2022.01) |
| *B01F 35/32* | (2022.01) |
| *B01F 101/13* | (2022.01) |

(52) U.S. Cl.
CPC .............. *A23G 9/224* (2013.01); *A23G 9/12* (2013.01); *B01F 23/23* (2022.01); *B01F 27/115* (2022.01);
(Continued)

(58) Field of Classification Search
CPC .... B01F 23/56; B01F 27/812; B01F 25/4511; B01F 27/27; B01F 27/8111; B01F 33/862; B01F 27/40; B01F 27/41; B01F 27/411; B01F 27/412; B01F 25/45; B01F 25/4523; B01F 27/2711; B01F 27/84; B01F 27/91; B01F 27/911; B01F 27/92; B01F 27/9213; B01F 27/9214; B01F 2215/0422; B01F 2215/0431; B01F 23/41; B01F 27/1921; B01F 25/105; B01F 25/60; B01F 27/1125; B01F 27/114; B01F 27/1145; B01F 27/70;

B01F 27/72; B01F 27/90; B01F 27/113; B01F 23/53; B01F 27/117; B01F 27/271; B01F 27/272; B01F 27/11; B01F 23/23; B01F 27/115; B01F 27/191; B01F 27/73; B01F 35/3204; B01F 2101/13; B01D 17/0217; B01D 19/0052; B02C 18/065; B02C 18/2216; B02C 18/2258;
(Continued)

(56) References Cited

U.S. PATENT DOCUMENTS

| | | | | | |
|---|---|---|---|---|---|
| 1,122,055 A | * | 12/1914 | Asbury | ................. | B02C 18/302 |
| | | | | | 241/82.5 |
| 1,435,796 A | * | 11/1922 | Bennett | ................. | B02C 18/302 |
| | | | | | 241/82.4 |

(Continued)

FOREIGN PATENT DOCUMENTS

| | | | | | |
|---|---|---|---|---|---|
| KR | 20050018471 A | * | 2/2005 | ............. | B01F 27/40 |
| KR | 20250081347 A | * | 6/2025 | ................ | C08J 3/12 |

*Primary Examiner* — Charles Cooley

(74) *Attorney, Agent, or Firm* — Brooks Kushman P.C.

(57) ABSTRACT

An apparatus is especially suitable for high volume manufacture of a non-dairy frozen dessert. Pre-frozen blocks of ingredient mixture are masticated in a first stage of the apparatus and aerated in a second stage of the apparatus. Compressed air is injected into a masticated slurry produced by the first stage and mixed into the slurry in the second stage. A continuous process transforms the pre-frozen blocks into a masticated, aerated slurry suitable for immediate consumption, storage for later consumption, or processing into bars or other forms. This apparatus and process is suitable for some ingredient mixtures for which a scrape surface heat exchanger apparatus and process are not suitable.

15 Claims, 2 Drawing Sheets

(52) U.S. Cl.
CPC ............ B01F 27/191 (2022.01); B01F 27/73
(2022.01); B01F 35/3204 (2022.01); *B01F*
*2101/13* (2022.01)

(58) Field of Classification Search
CPC ......... B02C 18/062; B02C 18/16; B02C 7/02;
B02C 18/302; B29C 48/0022; B29C
48/04; B29C 48/345; B29C 48/695; B29B
7/428; B29B 7/429; B29B 7/582; B29B
9/06; B29B 9/12; C08F 2/01; C08J 3/12;
C08J 3/24; A23G 9/224; A23G 9/12;
A23G 9/22
USPC ................................................. 366/302, 305
See application file for complete search history.

(56) References Cited

U.S. PATENT DOCUMENTS

| | | | | |
|---|---|---|---|---|
| 1,971,491 | A * | 8/1934 | Laemmel | B02C 18/36 |
| | | | | 241/82.5 |
| 2,218,119 | A * | 10/1940 | McAllister | B02C 18/36 |
| | | | | 241/246 |
| 2,633,170 | A * | 3/1953 | Balmain | B02C 18/302 |
| | | | | 366/181.4 |
| 3,323,570 | A * | 6/1967 | Tullock | B02C 18/302 |
| | | | | 366/186 |
| 3,542,104 | A * | 11/1970 | Anderson | B02C 18/302 |
| | | | | 241/82.5 |
| 3,779,565 | A * | 12/1973 | Witte | B02C 18/302 |
| | | | | 277/654 |
| 3,971,514 | A * | 7/1976 | Martinelli | B02C 18/302 |
| | | | | 241/82.5 |
| 4,948,614 | A | 8/1990 | Feldpausch | |
| 5,246,175 | A | 9/1993 | Feldpausch | |
| 5,861,183 | A | 1/1999 | Feldpausch | |
| 6,899,908 | B2 | 5/2005 | Roth | |
| 2003/0194473 | A1 | 10/2003 | Redding, Jr. et al. | |
| 2004/0121052 | A1 | 6/2004 | Roth | |
| 2009/0011087 | A1 | 1/2009 | Rabault et al. | |
| 2009/0142466 | A1 | 6/2009 | Robinson et al. | |
| 2017/0156366 | A1 | 6/2017 | Topp et al. | |
| 2024/0260605 | A1 * | 8/2024 | Feldpausch | B01F 27/115 |

* cited by examiner

MANUFACTURE OF NON-DAIRY FROZEN DESSERT

TECHNICAL FIELD

The present disclosure relates to a process and apparatus for manufacturing a non-dairy frozen dessert. More particularly, the disclosure relates to a process and apparatus in which the ingredients are pre-frozen before mastication and aeration.

BACKGROUND

Conventionally, ice cream is manufactured using scrape surface heat exchangers. The molecules are redistributed as they are being frozen. Air is distributed into the ingredient mixture during the process reducing the product density and yielding the desirable texture. This process relies on certain properties of the proteins in the ingredient mixture. Plant proteins don't act like dairy and egg proteins in making ice cream. As a result, ingredient lists for vegan ice creams are usually very long and complicated because they need to add more and more ingredients to make plants act and taste like dairy.

U.S. Pat. No. 5,246,175, to the inventor, discloses an apparatus for making a frozen dessert. An ingredient mixture is pushed into a masticating chamber using a piston. The aeration chamber is rectangular with rounded corners in cross section. A quantity of masticated product is introduced into the aeration chamber per aeration cycle. The degree of aeration, called overrun, is adjusted by adjusting the ratio of the volume of masticated product per cycle to the volume of the masticated chamber. A second piston ejects the finished product from the aeration chamber after each aeration cycle.

SUMMARY

An apparatus for making a frozen dessert includes a first stage, a second stage, and an air inlet tube. The first stage has an elongate auger tube, a rotatable spiral auger, an inlet tube, a grinding blade, a grinding plate, and a frusto-conical connector. The elongate auger tube has a circular bore. The rotatable spiral auger is coaxial within the bore. The inlet tube is attached to the auger tube and communicates with the bore for introducing a pre-frozen ingredient mixture to be masticated into a slurry and pushed forward through the auger tube by the spiral auger. The inlet tube may be attached to the auger tube at an acute angle slanted towards the outlet end. The rotating grinding blade is downstream of the spiral auger and is followed by the adjacent perforated grinding plate. The frusto-conical connector is attached to an outlet end of the auger tube forming a reduced diameter opening. The second stage includes an elongate mixing tube, a mixing drive shaft, one or more mixing blades, an outlet port, and a stop ring. A first end of the elongate mixing tube is connected downstream of the frusto-conical connector and has an open second end. The mixing drive shaft projects into the second end of the mixing tube. A motor may drive the mixing drive shaft at a speed between 3000 and 3600 revolutions per minute. The mixing blades are affixed to the mixing drive shaft allowing the masticated slurry to mix and pass thereby. The mixing blades may be disk shaped with a notched periphery. The mixing blades may include a deflected portion to push the slurry toward the first stage when the mixing drive shaft is rotated. The outlet port is formed in the mixing tube downstream of the mixing blades for discharging the still frozen masticated slurry. The stop ring, which is located beyond the outlet port, restricts further flow of the masticated slurry along the mixing drive shaft. The stop ring may be attached to the mixing drive shaft. The air inlet tube introduces pressurized air into the masticated slurry prior to the mixing blades to produce an aerated slurry of reduced density. The air inlet tube may extend into the mixing tube and may have an outlet orifice with a diameter between 0.002 inches and 0.010 inches.

A method of making a frozen dessert includes feeding blocks of pre-frozen ingredients into a grinder, driving a spiral auger to masticate the frozen ingredients into a frozen slurry, passing the frozen slurry through a frusto-conical section and a mixing tube, introducing pressurized air into the masticated slurry, and discharging the aerated slurry through a discharge port. The grinder has an elongate auger tube with a circular bore. The spiral auger rotates coaxially within the bore. A raw material inlet tube is attached to the auger tube in communication with the bore adjacent the spiral auger. A rotary blade is adjacent to a perforated grinding plate within the auger tube downstream of the spiral auger. The blocks of pre-frozen ingredient mixture are inserted into the raw material inlet tube. Driving the spiral auger pushes the pre-frozen ingredient mixture through the auger tube and through perforated grinding plate to masticate the pre-frozen ingredient mixture into a slurry. The frusto-conical section at the end of auger tube consolidates the slurry. The mixing tube has a first end connected downstream of the frusto-conical section and an open spaced apart second end. A motor driven mixing drive shaft is placed into the second end of the mixing tube. The motor driven mixing drive shaft may rotate at a speed between 3000 and 3600 revolutions per minute. The air may be introduced by routing air from an air compressor into the mixing tube through an orifice with a diameter between 0.002 inches and 0.010 inches. One or more mixing blades affixed to the mixing drive shaft allow the masticated slurry to mix and pass thereby. The pressurized air aerates the slurry reducing its density. Flow of the aerated slurry in the mixing tube is obstructed downstream of the mixing blades and discharged through the discharge port.

An apparatus for making a frozen dessert includes a first stage, a second stage, and an air inlet tube. The first stage has an elongate auger tube, a rotatable spiral auger, an inlet tube, a grinding blade, and a grinding plate. The spiral auger coaxial within a circular bore of the auger tube. The inlet tube is attached to the auger tube and communicates with the bore for introducing a pre-frozen ingredient mixture to be masticated into a slurry and pushed forward through the auger tube by the spiral auger. The inlet tube may be attached to the auger tube at an acute angle slanted towards the outlet end. The rotating grinding blade is downstream of the spiral auger and is followed by the perforated grinding plate. The second stage has an elongate mixing tube, a motor driven mixing drive shaft, one or more mixing blades, an outlet port, and a stop ring. A first end of the mixing tube is connected downstream of the auger tube. The mixing tube may be connected to the auger tube via a frusto-conical connector. The motor driven mixing drive shaft projects into an open second end of the mixing tube. A motor may drive the mixing drive shaft at a speed between 3000 and 3600 revolutions per minute. The mixing blades are affixed to the mixing drive shaft and allow the masticated slurry to mix and pass thereby. Each mixing blade may be disk shaped with a notched periphery. The outlet port is formed in the mixing tube downstream of the mixing blades for discharging the still frozen masticated slurry. The stop ring beyond the outlet port restricts further flow of the masticated slurry along the mixing drive shaft. The air inlet tube extends into the apparatus and introduces pressurized air into the masticated slurry prior to the mixing blades to produce an aerated slurry of reduced density. The air inlet tube may have an outlet orifice with a diameter between 0.002 inches and 0.010 inches.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Instead of trying to make plants act like dairy, a new machine takes advantage of the already great properties of plants. This results in a much simpler and more understandable ingredient list. Instead of using traditional scrape surface heat exchangers, which redistribute the molecules as they are being frozen, the machine redistributes the molecules after they are frozen.

Figure 1:
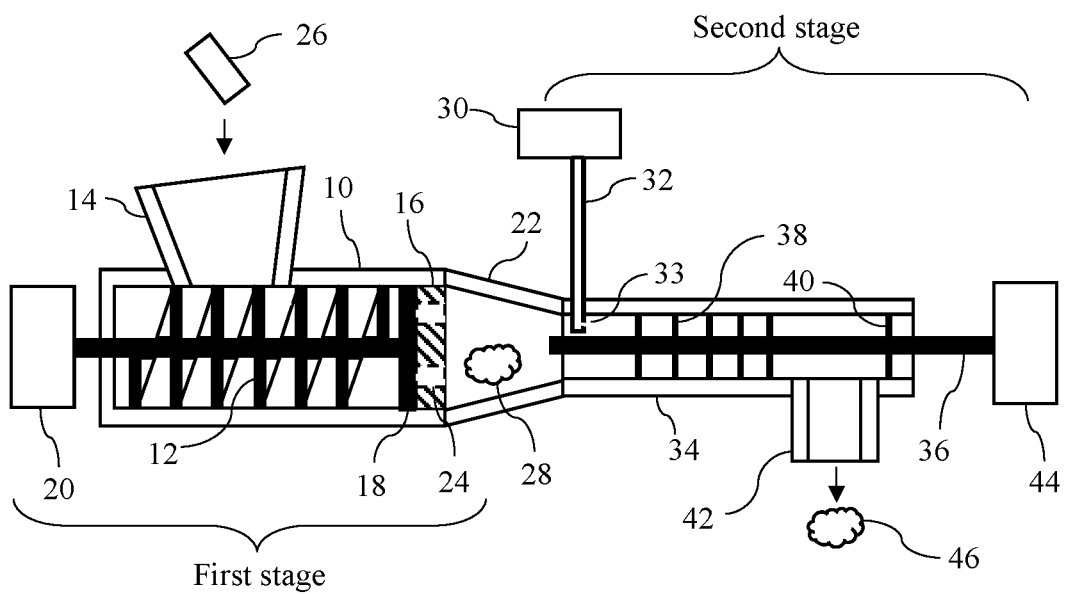
FIG. 1 is a block cross-sectional view of an apparatus for manufacturing non-dairy frozen dessert.

FIG. 1 illustrates a machine manufacturing a non-dairy frozen dessert. The machine of FIG. 1 addresses limitations and deficiencies that the inventor has discovered with regard to the machine of U.S. Pat. No. 5,246,175. The machine has two stages. A first stage converts a pre-frozen block of ingredients into a masticated slurry. A second stage aerates the masticated slurry to produce a slurry suitable for packaging into various forms such as quart containers or popsicles.

The first stage includes an auger tube 10, an auger 12, an inlet tube 14, a perforated grinding plate 16, a grinding blade 18, a first motor 20, and a connector 22. The auger 12 is contained within a circular bore of the auger tube 10. The perforated grinding plate 16 is fixed to an outlet end of the circular bore. Grinding plate 16 includes a number of openings, or perforations, 24. Grinding blade 18 is adjacent to the perforated grinding plate 16 and is attached to the auger 12. Motor 20 rotates the auger 12 and the grinding blade 18 within the circular bore. Inlet tube 14 is open on both end with one end open to the circular bore. In some embodiments, inlet tube 14 may be slanted toward the outlet end of auger tube 10. Blocks of frozen ingredient mixture 26 are inserted into the inlet tube 14. Spiral blades of the auger propel the frozen ingredient mixture toward the outlet end of the auger tube. The grinding plate 16 shaves off thin layers of the frozen mixture and forces these layers through the perforations 24, resulting in a masticated slurry 28 being deposited in the connector 22. The connector 22 may have a frusto-conical shape.

An air compressor 30 forces pressurized air through air inlet tube 32 into the mixing tube 34. The air inlet tube may have an air outlet orifice 33 with a diameter of 0.002-0.010 inches. This orifice diameter has been found to be large enough to introduce sufficient air into the slurry while being small enough to prevent slurry being pushed into the air inlet tube and causing blockages. In alternative embodiments, the air inlet tube may extend through a wall of the frusto-conical connector 22. In still other embodiments, the air may be injected into the masticated slurry via a hollow shaft 36 with one or more appropriately sized orifices.

The second stage includes a mixing tube 34, a mixing drive shaft 36, one or more mixing blades 38 downstream from the air orifice 33, a stop ring 40, and an outlet port 42. Mixing tube 34 has a cylindrical bore connected on an inlet end to connector 22. The bore of mixing tube 34 may have a smaller diameter than the bore of auger tube 10. The opposing end of mixing tube 34 is open such that a portion of shaft 36, the one or more mixing blades, and the stop ring 40 can be inserted from that end. The one or more mixing blades 38 are attached for rotation with shaft 36. The shape of the mixing blades 38 is discussed below. Some embodiments may have a plurality of mixing blades spaced apart from one another along shaft 36. A second motor 44 causes shaft 36 and mixing blades 38 to rotate within the bore of mixing tube 34. The masticated slurry 28 and the compressed air are propelled through the mixing tube 34 by auger 12 pushing additional masticated slurry into connector 22. As the masticated slurry and the air move through the mixing tube, the mixing blades distribute the air through the slurry to create an aerated slurry 46. Stop ring 40, which may be attached to shaft 36, stops the slurry from coming out the end of the mixing tube. The aerated slurry 46 drops out of the mixing tube through the outlet port which is connected to the bore of the mixing tube between the mixing blades and the stop ring. The shaft may be rotated at a speed between 3000 rpm and 3600 rpm, which has been discovered to be effective at creating an aerated slurry with a desirable density and texture. The shaft may be directly connected to a rotor of motor 44 as shown in FIG. 1 or gearing may be used to allow the motor speed to differ from the shaft speed. The speed of mixing shaft 36 is substantially higher than the speed of auger 12. This may be accomplished using multiple drive motors as illustrated in FIG. 1 or using gearing.

Figure 2:
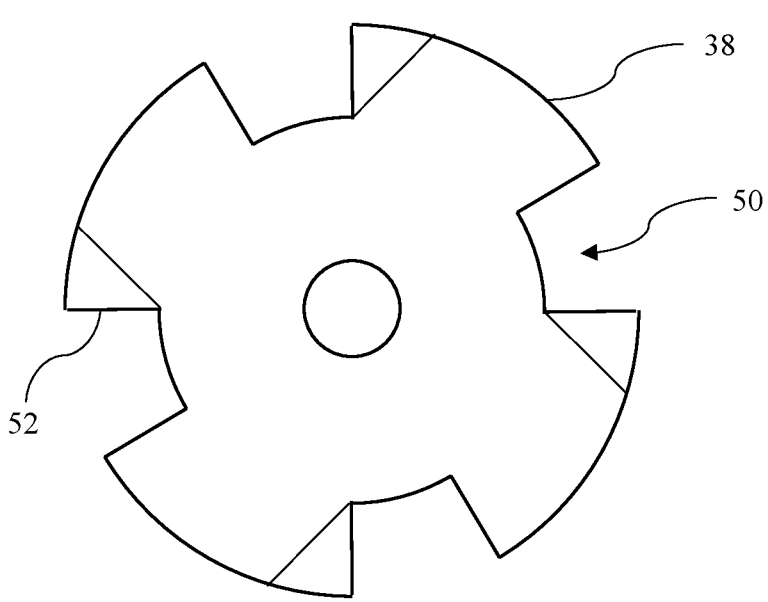
FIG. 2 is an end view of a mixing blade for use in the apparatus of FIG. 1.

FIG. 2 is an end view of an exemplary mixing blade 38. The mixing blades 38 may be substantially disk shaped with one or more notches 50 cut out around the perimeter. The slurry must flow through the notches to move past the mixing blade. In the process, pockets of entrained air are broken up into smaller pockets of air such that the air is distributed more evenly through the slurry. In some embodiments, some portions 52 of the mixing blades 38 may be bent slightly in a direction that tends to push the slurry back towards the first stage.

Figure 3:
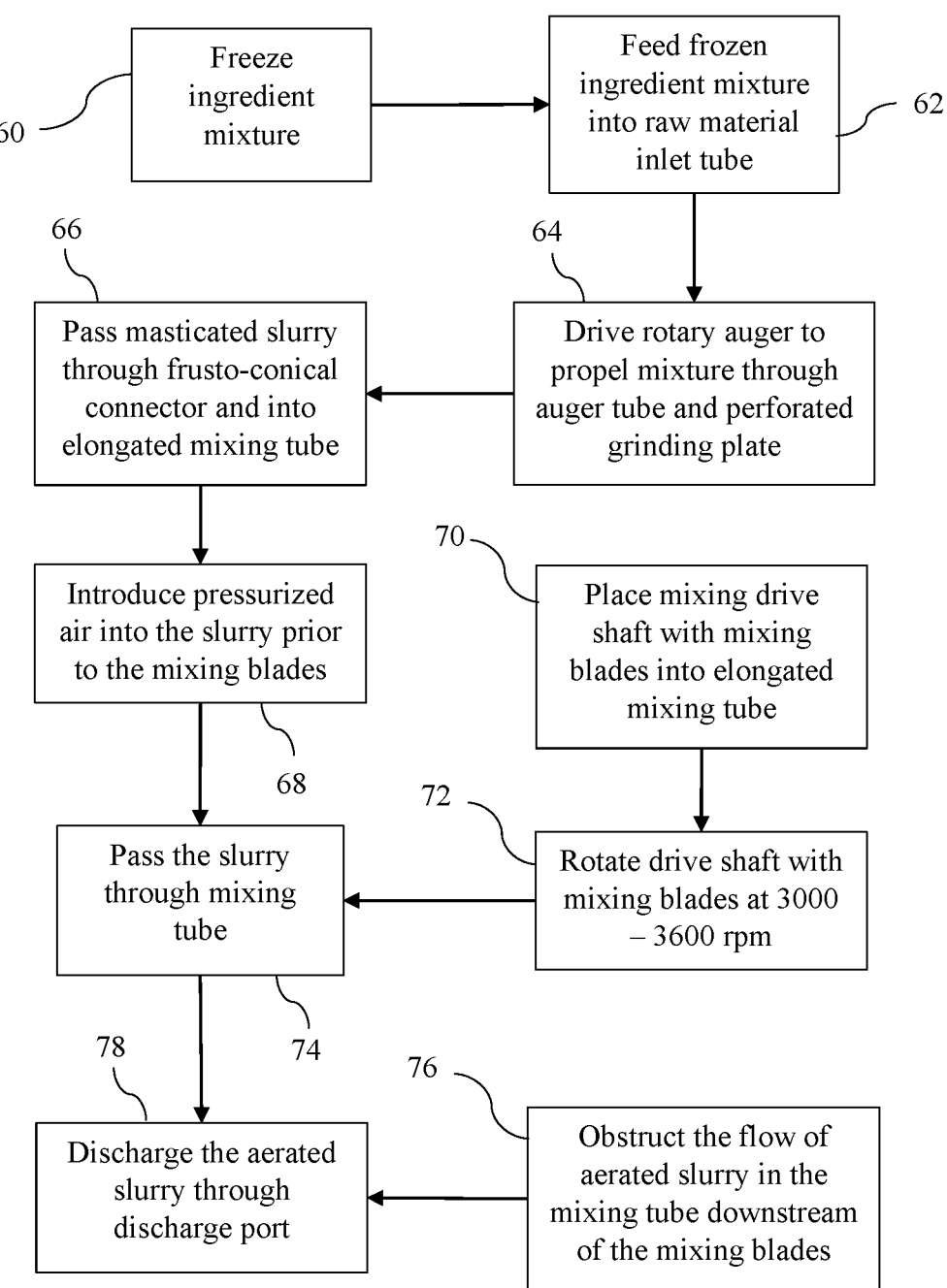
FIG. 3 is a flowchart for a process of using the apparatus of FIG. 1 to manufacture non-dairy frozen dessert.

FIG. 3 is a flow chart for a process of manufacturing frozen dessert using the apparatus of FIG. 1. At 60, blocks of ingredient mixture are pre-frozen. The ingredient mixture need not contain any dairy products or other ingredients which simulate the properties of dairy proteins, although the process can accommodate such ingredients if desired. At 62, blocks of the pre-frozen ingredient mixture are fed into the inlet tube 14. At 64, rotary auger 12 is driven to propel the ingredient mixture through the auger tube and through openings 24 of the perforated grinding plate 16. The auger may be driven, for example, by first motor 20. This masticates the solid blocks of pre-frozen ingredient mixture into a slurry.

The masticated slurry is passed through frusto-conical connector 22 at 66, consolidating the slurry. At 68, pressurized air is introduced into the slurry upstream of mixing blades 38. This may be accomplished, for example, using air compressor 30 and air inlet tube 32.

At 70, mixing drive shaft 36, to which one or more mixing blades 38 are attached, is placed into mixing tube 34. The shaft is rotated at 72. For example, the shaft may be rotated at a speed between 3000 rpm and 3600 rpm using second motor 44. At 74, the slurry is passed through the mixing tube 34. More specifically, the slurry may be passed through notches 50 in the mixing blades 38. The mixing blades 38 are configured to allow the masticated slurry to pass while mixing the slurry with air. At 76, and end of the mixing tube 34 is obstructed downstream of the mixing blades. For example, the flow may be obstructed by a stop ring 40 attached to the shaft 36. At 78 the aerated slurry is discharged through a discharge port located between the mixing blades 38 and the stop ring 40. The aerated slurry may then be processed for immediate consumption or for frozen storage.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for making a frozen dessert, comprising;
a first stage having:
an elongate auger tube with a circular bore,
a rotatable spiral auger coaxial within the circular bore,
an ingredient inlet tube attached to the elongate auger tube and communicating with the circular bore for introducing a pre-frozen ingredient mixture to be masticated into a slurry and pushed forward through the elongate auger tube by the rotatable spiral auger,
a rotating grinding blade downstream of the rotatable spiral auger followed by an adjacent perforated grinding plate, and
a frusto-conical connector attached to an outlet end of the elongate auger tube forming a reduced diameter opening;
a second stage having:
an elongate mixing tube with a first end connected downstream of the frusto-conical connector with an open spaced apart second end,
a motor driven mixing drive shaft projecting into the second end of the elongate mixing tube,
one or more mixing blades affixed to the motor driven mixing drive shaft,
an outlet port formed in the elongate mixing tube downstream of the one or more mixing blades for discharging the still frozen masticated slurry, and
a stop ring beyond the outlet port restricting further flow of the masticated slurry along the motor driven mixing drive shaft; and
an air inlet tube extending into the apparatus for introducing pressurized air into the masticated slurry prior to the one or more mixing blades to produce an aerated slurry of reduced density.

2. The apparatus of claim 1 wherein the one or more mixing blades comprises a plurality of axially spaced apart mixing blades.

3. The apparatus of claim 1 wherein each of the one or more mixing blades are disk shaped with a notched periphery.

4. The apparatus of claim 3 wherein each of the mixing one or more mixing blades includes a deflected portion configured to push the slurry toward the first stage when the motor driven mixing drive shaft is rotated.

5. The apparatus of claim 1 wherein the second stage further comprises a motor configured to drive the motor driven mixing drive shaft at a speed between 3000 and 3600 revolutions per minute.

6. The apparatus of claim 1 wherein the ingredient inlet tube is attached to the elongate auger tube at an acute angle slanted towards the outlet end.

7. The apparatus of claim 1 wherein the air inlet tube extends into the elongate mixing tube.

8. The apparatus of claim 1 wherein the air inlet tube has an outlet orifice with a diameter between 0.002 inches and 0.010 inches.

9. The apparatus of claim 1 wherein the stop ring is attached to the motor driven mixing drive shaft.

10. An apparatus for making a frozen dessert, comprising;
a first stage having:
an elongate auger tube with a circular bore,
a rotatable spiral auger coaxial within the circular bore,
an ingredient inlet tube attached to the elongate auger tube and communicating with the circular bore for introducing a pre-frozen ingredient mixture to be masticated into a slurry and pushed forward through the elongate auger tube by the spiral rotatable spiral auger, and
a rotating grinding blade downstream of the rotatable spiral auger followed by an adjacent perforated grinding plate;
a second stage having:
an elongate mixing tube with a first end connected downstream of the elongate agger tube with an open spaced apart second end,
a motor driven mixing drive shaft projecting into the second end of the elongate mixing tube,
one or more mixing blades affixed to the motor driven mixing drive shaft,
an outlet port formed in the elongate mixing tube downstream of the one or more mixing blades for discharging the still frozen masticated slurry, and
a stop ring beyond the outlet port restricting further flow of the masticated slurry along the motor driven mixing drive shaft; and
an air inlet tube extending into the apparatus for introducing pressurized air into the masticated slurry prior to the one or more mixing blades to produce an aerated slurry of reduced density.

11. The apparatus of claim 10 wherein the elongate mixing tube is connected to the elongate auger tube via a frusto-conical connector.

12. The apparatus of claim 10 wherein the one or more mixing blades comprises a plurality of mixing blades, each mixing blade being disk shaped with a notched periphery.

13. The apparatus of claim 10 wherein the second stage further comprises a motor configured to drive the motor driven mixing drive shaft at a speed between 3000 and 3600 revolutions per minute.

14. The apparatus of claim 10 wherein the inlet ingredient inlet tube is attached to the elongate auger tube at an acute angle slanted towards the outlet end.

15. The apparatus of claim 10 wherein the air inlet tube has an outlet orifice with a diameter between 0.002 inches and 0.010 inches.

* * * * *